Oct. 20, 1942. W. S. FRAULA Re. 22,204

PRODUCTION OF EXPANDED METAL INSERTS FOR BRAKE SHOES AND SIMILAR CASTINGS

Original Filed Nov. 18, 1938 5 Sheets-Sheet 1

Inventor:
William S. Fraula
By: Belt, Wallace & Cannon
Attorneys

Oct. 20, 1942. W. S. FRAULA Re. 22,204

PRODUCTION OF EXPANDED METAL INSERTS FOR BRAKE SHOES AND SIMILAR CASTINGS

Original Filed Nov. 18, 1938 5 Sheets-Sheet 2

Inventor:
William S. Fraula,
By: Belt, Wallace & Cannon
Attorneys

Oct. 20, 1942. W. S. FRAULA Re. 22,204

PRODUCTION OF EXPANDED METAL INSERTS FOR BRAKE SHOES AND SIMILAR CASTINGS

Original Filed Nov. 18, 1938 5 Sheets-Sheet 3

Inventor:
William S. Fraula.
By: Belt, Wallace & Cannon
Attorney.

Oct. 20, 1942. W. S. FRAULA Re. 22,204

PRODUCTION OF EXPANDED METAL INSERTS FOR BRAKE SHOES AND SIMILAR CASTINGS

Original Filed Nov. 18, 1938 5 Sheets-Sheet 4

Inventor:
William S. Fraula,
By: Belt, Wallace & Cannon
Attorneys

Oct. 20, 1942. W. S. FRAULA Re. 22,204

PRODUCTION OF EXPANDED METAL INSERTS FOR BRAKE SHOES AND SIMILAR CASTINGS

Original Filed Nov. 18, 1938 5 Sheets-Sheet 5

Inventor:
William S. Fraula.
By: Bell, Wallace & Cannon
Attorneys

Reissued Oct. 20, 1942

Re. 22,204

UNITED STATES PATENT OFFICE 22,204

PRODUCTION OF EXPANDED METAL INSERTS FOR BRAKE SHOES AND SIMILAR CASTINGS

William S. Fraula, Suffern, N. Y., assignor to The American Brake Shoe and Foundry Company, New York, N. Y., a corporation of Delaware Original No. 2,215,549, dated September 24, 1940, Serial No. 241,225, November 18, 1938. Application for reissue September 23, 1941, Serial No. 412,052

12 Claims. (Cl. 29—33)

This invention relates to the production of expanded metal inserts for brake shoes and similar castings and, while the invention is so entitled and will be explained hereinafter with particular reference to the production of such inserts, it is to be understood that it is adaptable for other usages and especially to those entailing the handling of material likely to cut or otherwise injure the hands of those employed in the production of articles from such material and also in those instances where the material does not freely slide upon itself or entails other kindred handling problems.

In this application certain apparatus is shown and described which is identical with apparatus shown and described in my co-pending application, Patent No. 2,188,146, patented January 23, 1940, for this invention pertains to an improvement on that of my aforesaid co-pending application. The machine of this invention produces expanded metal inserts for brake shoes and similar castings and the like which are firmly joined to afford units that may be handled as necessary, without separating and enables production of such articles with a minimum of handling and operations so as to avoid cutting of the hands of an operator and also to avoid ripping or other damage to the clothing of the operator.

Expanded metal inserts have heretofore been made of a plurality of layers of expanded metal bent to shape and bound together by wires, and among the objects of this invention is to weld the layers of expanded metal together whereby the wire binding heretofore employed may be eliminated.

Another object is to shape the inserts and weld the layers thereof together in a single operation to have the welds hold the inserts in the produced shape or configuration.

A further object is to synchronize the cutting of the expanded metal sheet material, the stacking of the cut material, the packing thereof, the shaping of the inserts and the securing together of the layers thereof so that the inserts need not be handled during the process of manufacture thereof.

Still further objects are to automatically produce inserts and to produce finished products free of projecting wires or other sharp or pointed projections extending from the bodies thereof.

Other and further objects of the invention will be apparent from the following description wherein reference is made to the accompanying drawings in which Fig. 1 is a side elevation of the machine embodying the invention;

Figure 1:
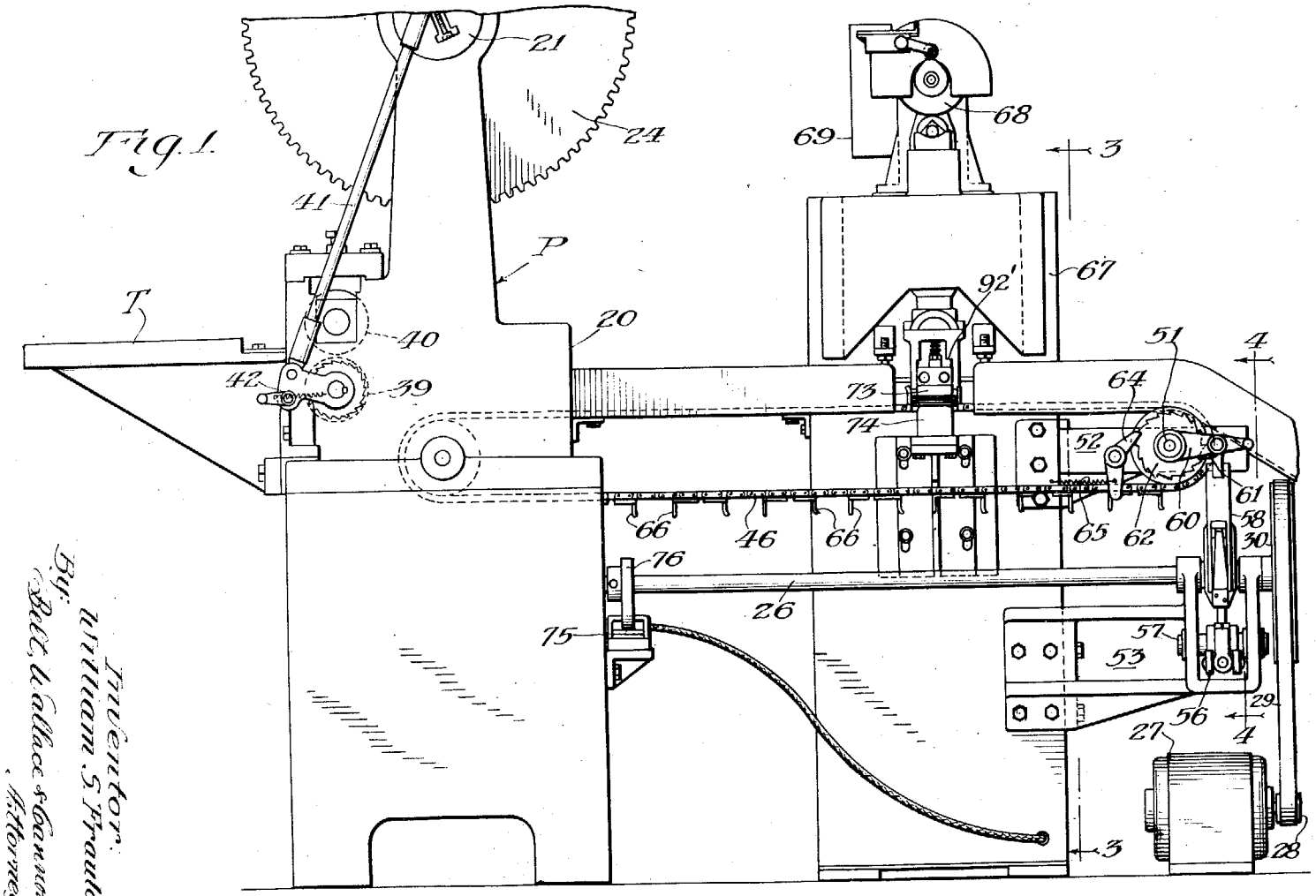
Figure 2:
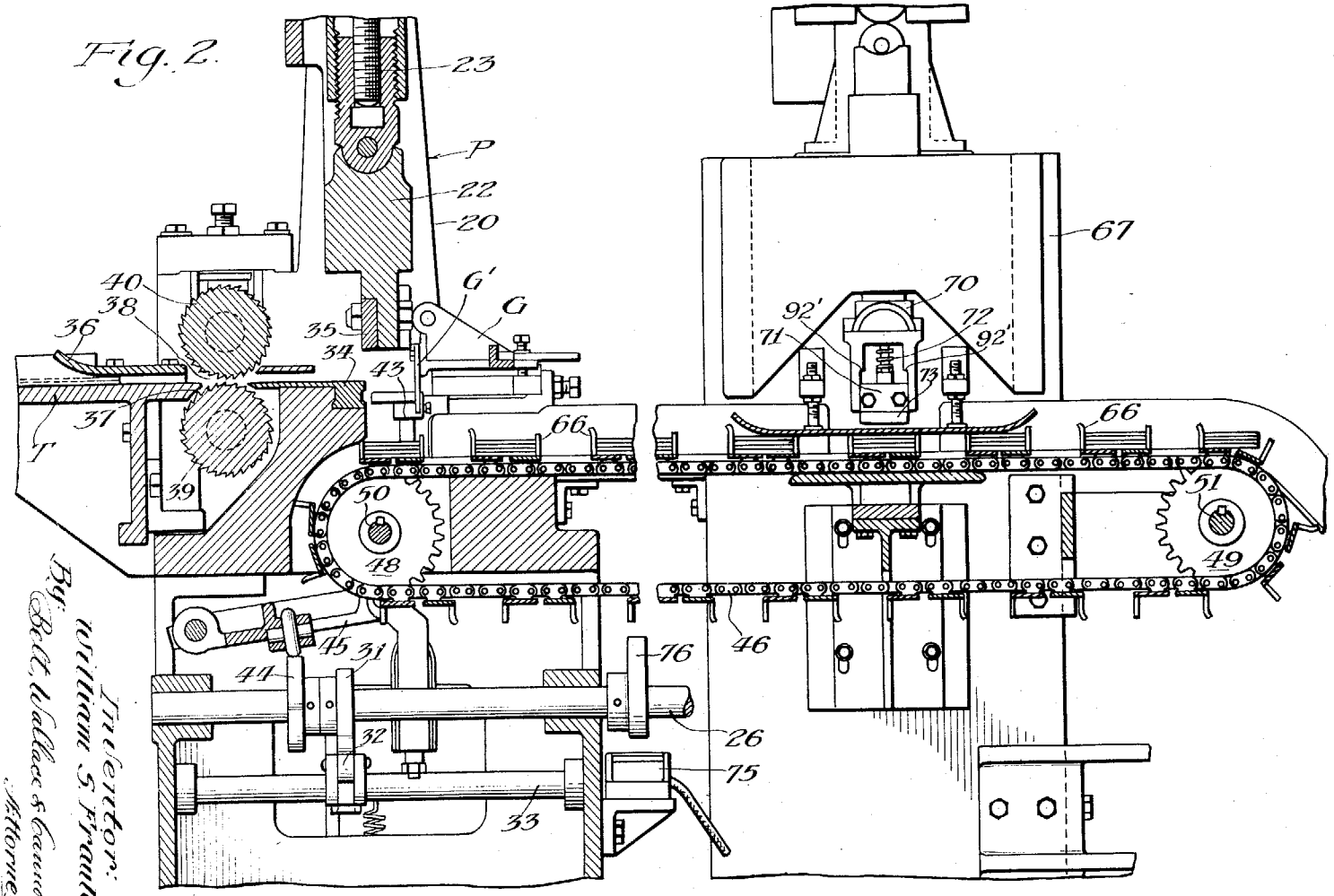
Fig. 2 is a vertical sectional view taken substantially on the longitudinal center line of the machine.
Figure 3:
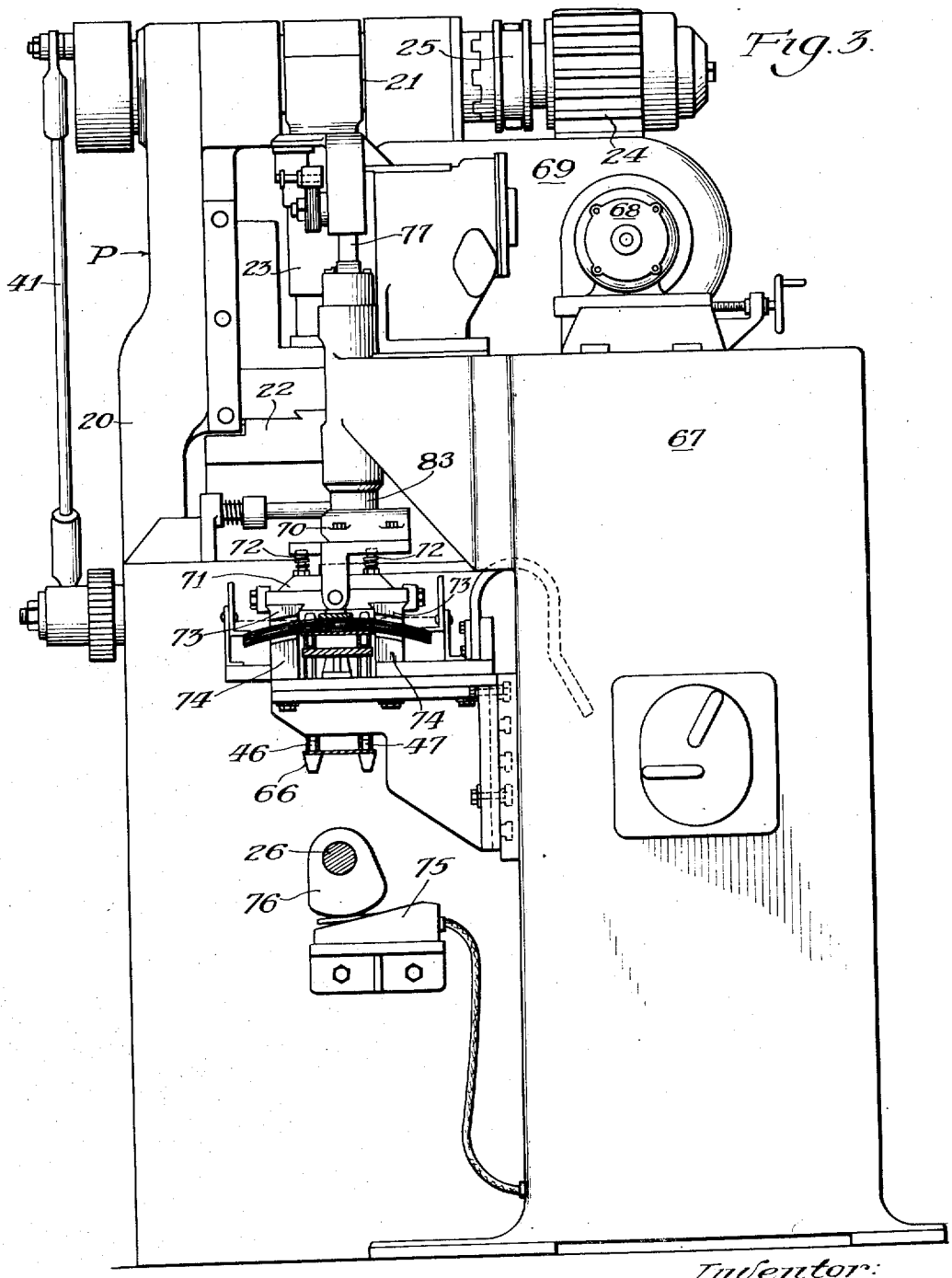
Fig. 3 is a vertical sectional view taken substantially on the line 3—3 on Fig. 1.

At what may be called the rear end of the machine, and which appears at the left in Figs. 1 and 2, is a punch press P comprising a frame, generally indicated by 20, having a crank shaft 21, Fig. 3, journaled therein at the upper end thereof. The ram 22 of the press is connected to the crank shaft by the usual pitman 23 to be reciprocated vertically in the operation of the press. Power for operating the shaft 21 is supplied to the flywheel 24 from a suitable motor (not shown) under control of a suitable switch (not shown). A clutch 25 is interposed between the flywheel 24 and the shaft 21 and is operable to connect the shaft with the flywheel.

In order to insure positive timed operation of the various operating parts, cams are provided on a longitudinally extending cam shaft 26 which is suitably journaled in the frame of the machine and operation of the various parts of the machine is controlled by such cams. A motor 27 has a pulley 28 fast on the shaft thereof. A belt 29 is passed about the pulley 28 and about a pulley 30 fast on the cam shaft 26. The ratio between the trolley 28 and pulley 30 is suitable to drive the shaft 26 at the proper speed.

A cam 31 on the shaft 26 operates a lever 32 pivotally mounted on the shaft 33 journaled in the frame 20 of the punch press. The lever 32 is connected by a link to the control means of the clutch of the punch press whereby operation of the cam 31 controls engagement and release of the clutch 25. The speed of the shaft 21 is so related to that of the shaft 26 that the ram of the punch press will make three complete reciprocations in each revolution of the cam shaft 26. This is accomplished by suitable formation of the cam 31 to provide it with a prolonged rise allowing the clutch 25 to remain engaged for three revolutions of the shaft 21.

Figure 5:
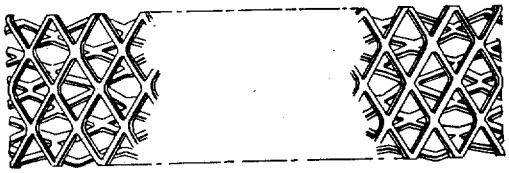
Fig. 5 is a plan view of a bundle or insert produced by the invention.
Figure 7:
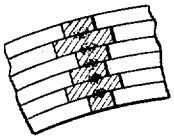
Fig. 7 is a detailed sectional view taken through the insert at one end thereof showing the manner in which the layers of expanded metal are welded together to form the insert.
Figure 6:
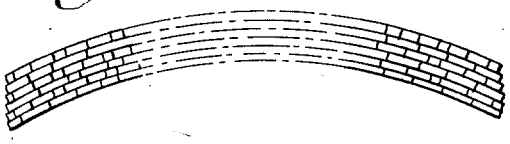
Fig. 6 is a front elevation of the insert of Fig. 5.

A stationary cutter 34, Fig. 2, is provided on the bed of the press P. A cutter 35 is mounted at the lower end of the ram and in the reciprocation of the ram cooperates with the stationary cutter 34 to shear material disposed over the cutter 34. The material to be sheared in the present instance is expanded metal in the form of sheets. The sheets are of a width corresponding to the desired length of the inserts so that only one transverse cut of the sheet is necessary to provide a blank of a desired size. The expanded metal is illustrated in Fig. 5 and it will be seen that the metal is expanded to provide substantially diamond-shaped openings therein. Preferably, though not necessarily, the sheets S of expanded metal are fed to the press P in pairs. When this is done it is desirable to have the longer length of the diamond-shaped openings in one sheet extended at right angles to the longer length of the diamond-shaped openings in the other sheet. With such an arrangement, in three reciprocations of the ram 22, three pairs of layers of sheet material are cut and the alternate layers have the diamond-shaped openings extending in opposed directions, as is illustrated in Fig. 5, thus providing an insert of six layers.

An elongated table T is secured to the rear side of the press P and the sheets of expanded metal are rested on this table and fed forwardly to pass under a guide plate 36 disposed above and spaced from the table, in the present instance, in an amount sufficient to enable two sheets of expanded metal to pass beneath the guide plate. An opening 37 is provided in the table and an opening 38 is provided in the plate 36 in alignment with the opening 37. A part of the periphery of a roller 39 extends through the opening 37 and a part of the periphery of a roller 40 extends through the opening 38. The roller 39 is operated from the crank shaft 21 through the lever 41 and a ratchet device 42, this mechanism operating to rotate the roller 39 in a step by step manner, each revolution of the crank shaft 21 causing one forward rotative step of the roller. An adjustable gauge device G is provided on the bed of the press P and the operation of the roller 39 is so adjusted that the leading edges of the sheets S fed between the rollers 39 and 40 are fed into engagement with the gauge plate G' on the gauge device G in each operation of the rollers 39 and 40 whereby blanks of uniform width are cut in successive operations of the ram 22.

If the blanks cut from the sheets S were allowed to fall freely they might become jammed in a cocked position. Hence, to insure neat stacking of the cut blanks, I provide leveling fingers including a pair of plungers 43 that are mounted for reciprocal movement in vertically extending bores provided in the frame 20 to lie beneath the extended ends of the sheets extending over the cutter 34. Operation of these plungers is controlled by the cam 44 on the cam shaft 25 and the arm 45 arranged to engage the cam surface of the cam 44. The cam 44 is so formed that the plungers 43 are lowered a suitable distance after each cutting operation of the cutters 34 and 35 to accommodate the next pair of layers of expanded metal. After the third pair of layers has been cut the plungers are lowered sufficiently to deposit all the layers on a conveyor (to be described hereinafter) whereupon the cut layers are moved from beneath cutting position and the cam 44 causes the plungers to rise to the position shown in Fig. 2 in readiness to receive the layers to comprise the next insert.

Figure 4:
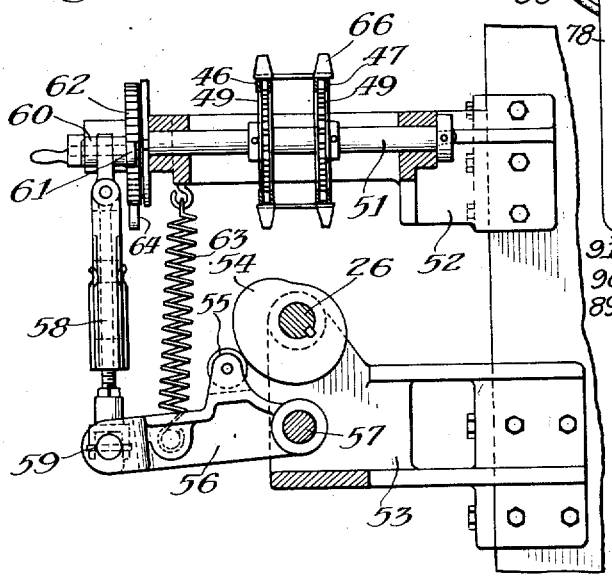
Fig. 4 is a detail sectional view taken on the line 4—4 on Fig. 1.

The conveyor comprises a pair of endless chains 46 and 47 passing about sprockets 48 at the punch press end of the machine and sprockets 49 at the discharge end. The sprockets 48 are mounted on a shaft 50 journaled freely in the frame 20 and the sprockets 49 are fixedly mounted on the conveyor drive shaft 51 journaled in a bracket 52 mounted on the frame of the welding machine (to be described hereinafter). Referring to Fig. 4, it will be noted that the cam shaft 26 is journaled in a bracket 53 mounted on the welding machine frame. The shaft 26 has a cam 54 keyed thereto which is engaged on its periphery by a cam roller 55 carried on a lever 56 pivotally mounted at 57 on the bracket 53. An adjustable rod 58 is pivotally mounted at one end of the lever at 59. The rod 58 is pivotally secured at its other end to another lever 60 pivotally and freely mounted on shaft 51. The lever 60 carries a pawl 61 arranged to engage the teeth of a ratchet wheel 62 fixedly secured to the shaft 51. A spring 63 secured to the lever 56 holds the roller 55 in engagement with the cam 54 so that with every revolution of the cam shaft 26 the chains 46 and 47 are advanced a predetermined amount by the operation of the lever 56, rod 58, pawl 61, and ratchet wheel 62. A retaining pawl 64, held in engagement with the ratchet wheel 62 by the spring 65, prevents backward movement of the shaft 51 and chains 46 and 47.

A plurality of pairs of bundle receivers 66 are secured to the chains at spaced intervals. Each receiver comprises L-shaped members that have the base of the L secured to the adjacent chain with the upright part of the L extending perpendicularly to the chain. The L-shaped members are arranged in oppositely disposed pairs and the layers cut from the sheet material are deposited between the members of the pairs at the left end of the upper pass of the conveyor, as viewed in Fig. 2. The forward movement of the chain is such that each step brings a new receiver into such bundle receiving position and in the course of operation of the machine this results in the discharge of a completed bundle from the right end of the conveyor.

The welding machine comprises a frame 67 having an electric motor 68 mounted thereon that, through a suitable variable speed device within the housing 69, operates the plunger 70 through the intermediary of an electrically controlled clutch. The plunger has an equalizer 71 pivotally mounted on the lower end thereof with compression springs 72 interposed between the equalizer and the plunger so that equal pressure will be exerted on the upper welding dies 73 mounted on the ends of the equalizer. Lower stationary welding dies 74 are arranged beneath the dies 73 and have complementary faces thereon. The faces of opposed dies are so formed that when the upper dies are moved toward the lower dies with a stack of expanded metal layers interposed therebetween, such stack is bent into the desired longitudinal arc. The stacks are moved into position between the dies in the course of operation of the conveyor.

Figure 8:
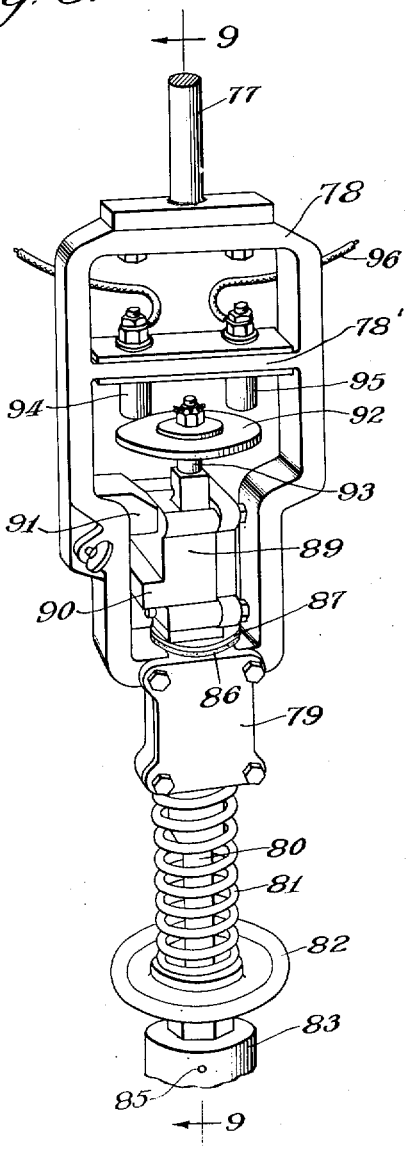
Fig. 8 is a perspective view of a mechanism for automatically controlling the welding operation.
Figure 9:
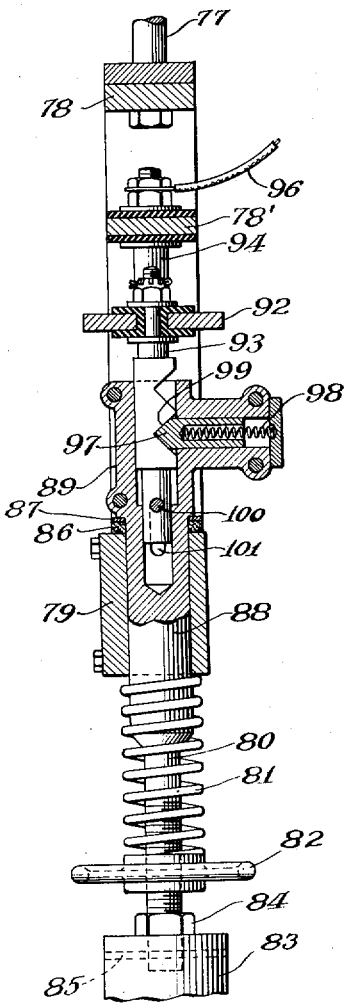
Fig. 9 is a sectional view taken along the line 9—9 of Fig. 8.

The machine is so constructed that at the time the dies engage the stack and pressure is exerted on the layers of insert, circuit is closed between the cooperating upper and lower welding dies and thereupon the layers are welded together between the dies. The circuit is broken prior to the time the plunger 70 is raised, this being done ina manner now to be described. Referring to Figs. 3, 8 and 9, a connecting rod 77 is secured to a yoke member 78, the lower reduced end of this yoke member being formed to receive a second connecting rod 80, as is indicated at 79, the connecting rod 80 being adapted to slide vertically within limits against the expanding force of a coiled compression spring 81. The reduced lower portion of connecting rod 80 is screw-threaded to carry an adjusting nut or hand wheel 82 for changing the tension of the spring.

The sliding portion 83 of plunger 70 is also adjustably connected to the rod 80 and is retained in adjusted position by a nut 84. A hole 85 may be drilled through portion 83 and the threaded end of rod 80 after assembly to provide for the insertion of a lock pin, or any similar arrangement could be adopted for the purpose of preventing plunger 70 from turning while the machine is in operation.

A leather washer 86 with a metal locking plate 87 is sleeved on the enlarged round portion 88 of rod 80 above the flat top of part 79 to cushion the seating of the enlarged head 89 of rod 80 when spring 81 forces conecting rod 80 downwardly. The upward movement of the rod with respect to yoke 78 is limited by engagement of a stop lug 90 on the head 89 of the rod 80 with a stop lug 91 on the yoke 78. When connecting rod 77 is depressed at the start of a welding operation, pressure is transmitted through yoke 78, compression spring 81 and rod 80 to plunger 70 (the plunger 70 having previously been in raised position above the bundle), whereupon plunger 70 is depressed. When the upper welding dies 73 contact the bundle, spring 81 is compressed and downward motion of pluger 70 and upper welding dies 73 takes place by reason of the force exerted by spring 81.

In this connection it is to be noted that yoke 78 does not commence to move relatively to head 89 until the bundle has been engaged by the upper welding dies 73. Equalizer springs 72 will then be compressed and the shoulders 92', Figs. 1 and 2, on plunger 70 will thereafter engage the equalizer block 71, whereby further downward movement of plunger 70, under the action of spring 81, serves to bend the layers of inserts on the bundle into the desired shape which is completed when the bundle is tightly clamped between the upper and lower welding dies.

Before lug 91 strikes lug 90 a contact disc 92 carried on a ratchet stem 93 within the upper end of head 89 engages a pair of contact studs 94 and 95 supported side by side on a cross bar 78' of the yoke, said contacts being insulated from said cross bar. Engagement of the contact studs with the contact disc closes an electric circuit through conductors 96 in the welding circuit in which an electric welding transformer and the welding dies 73 and 74 are included as is well understood in the art.

When contact is established between disc 92 and contact studs 94 and 95 the disc will, for the time being, move with the contact studs as the yoke 78 continues to descend. The spring 81 is of sufficient stiffness that it will exert the required pressure to bend the layers of the inserts into the predetermined arc and circuit is closed as aforesaid when this shape has been attained and while the spring 81 is undergoing further compression.

Circuit is broken shortly before lugs 90 and 91 meet, so that the circuit will have been closed and then opened again during the interval when there is relative movement between head 89 and yoke 78. As stem 93 is pushed downwardly, dog 97, mounted in the head 89, will be moved laterally outwardly against the action of its retaining spring 98, until the high point of the tooth 99 has passed below the point on the beveled edge of dog 97, whereupon spring 98 will press dog 97 inwardly and cause its beveled edge to ride upon the upper bevelel part of tooth 99 thereby forcing ratchet stem 93 and contact disc 92 downwardly with a snap movement, thus shutting off the welding current. Thereupon lug 91 bears on lug 90, causing the layers of inserts to be positively clamped between the upper and lower welding dies while the metal is cooling after the welding operation.

Figure 10:
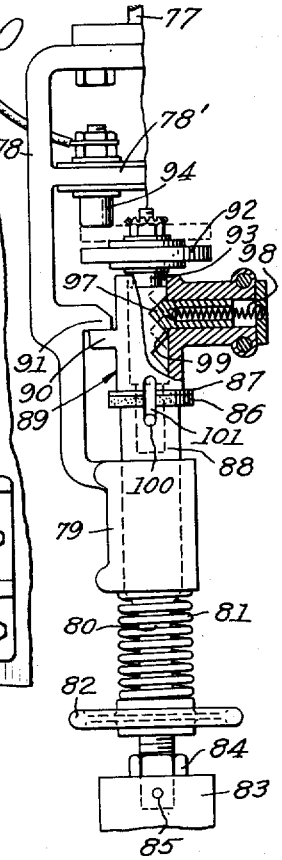
Fig. 10 is a schematic view similar to Fig. 9 and showing the welding control mechanism in various operating positions, part of the apparatus having been revolved about its vertical axis in the figure to enhance the clarity.

The relative positions assumed by the working parts of the welding control mechanism, after the point of the tooth 99 on the ratchet stem 93 has descended past the point on the spring-urged dog 97 in the head 89, are shown in full lines in the schematic view, Fig. 10. Shortly before the lug 91 engaged the lug 90, the disc 92, ratchet stem 93, and dog 97 occupied the positions indicated in dotted lines in Fig. 10, the point on the tooth 99 having been pushed to a position where it contacted the point on the spring-urged dog 97, and at such position the disc 92 was still maintaining contact between the studs 94 and 95. Continued movement of the yoke 78 relative to the head 89 then caused the disc 92 and ratchet stem 93 to be pushed still farther downwardly by the studs 94 and 95, with the effect hereinabove described, the ratchet stem 93 being cammed downwardly with a snap movement, so that circuit to the welding dies is broken by the time the lugs 90 and 91 meet.

After connecting rod 77 and its associated yoke assembly have been restored to raised position by the means which brought about lowering thereof, the spring 81 forces the head 89 to seat on part 79. Plunger 70 will then be raised, drawing the upper welding dies 73 out of clamping engagement with the bundle. When ratchet stem 93 was depressed to cause breaking of the circuit to the welding dies, pin 100 on stem 93 was made to occupy a position at the lower end of slot 101 in head 89, as shown in Fig. 10, but when spring 81 forces head 89 to seat on part 79, the upper edge of part 79 will push pin 100 to a point where the camming action of dog 97 will restore ratchet stem 93 to the position shown in Fig. 9.

It is to be understood that the apparatus shown in Figs. 8, 9 and 10 is merely illustrative of a means which can be employed to effect the welding and bending operations and that other equivalent means might be employed if so desired.

After the upper welding dies 73 have been withdrawn from the bundle, the conveyor is operated to carry the welded bundle out of welding position and bring the next stack of layers into position between the welding dies. The operation of the welding machine is controlled by a switch 75 operated at predetermined intervals by the cam 76 on the cam shaft 26 and in this way the welding apparatus is synchronized with the movements and operations of the remainder of the machine, the switch 75 controlling the aforesaid electrically operated clutch in the welding machine.

The welding dies 73 perform a duel function, that is, these dies impart a longitudinal arc to the stack of layers, such as is desired when inserts for brake shoes are being produced in the machine, and also secure the layers together. Since the weld is effected at the time the layers are bent, the imparted longitudinal arc is permanently retained in the bundles.

It will be seen from the foregoing that I have provided a machine wherein it is necessary to handle the expanded metal only when feeding sheets thereof to the machine, the cutting, stacking, packing, conveying, shaping, welding and delivery of the inserts from the machine being done entirely automatically.

In the foregoing description I have described my invention as particularly adapted for forming inserts for brake shoes or similar castings from expanded metal, but it is to be understood that the invention is not limited to such usage but is especially adapted for usage in those instances where articles are to be made from material that is difficult to handle or likely to injure the hands or tear the clothing of operatives, or the like, and therefore I am not to be limited to the precise details set forth but desire to avail myself of such changes and alterations as fall within the purview of the following claims.

I claim:

1. In a machine of the class described, means for severing substantially flat blanks from sheet material, receiving means on which the severed blanks are deposited in stacked relationship, conveying means for conveying the stacked blanks from the receiving means, and bending and welding means to apply a predetermined bend to the stacked blanks and to weld them together to hold said predetermined bend.

2. In a machine of the class described, means for severing blanks from sheet material, receiving means on which the severed blanks are deposited in stacked relationship, conveying means for conveying the stacked blanks from the receiving means, and welding means having complementarily shaped upper and lower dies whereby when said dies are brought together they impart a predetermined shape to said stacked blanks and weld said blanks together to hold said predetermined shape.

3. In a machine of the class described, means for severing blanks from sheet material, receiving means on which the severed blanks are deposited in stacked relationship, conveying means for conveying the stacked blanks from the receiving means, and welding means, said conveyor arranged to convey said stacked blanks into said welding means, said welding means having complementarily shaped upper and lower dies whereby when said dies are brought together they impart a predetermined shape to said stacked blanks and weld said blanks together to hold said predetermined shape, said conveying means arranged to convey said welded blanks from said welding means.

4. In a machine of the class described, means for severing blanks from sheet material, receiving means on which the severed blanks are deposited in stacked relationship, conveying means for conveying the stacked blanks from the receiving means, welding means comprising a pair of spaced upper dies and a pair of spaced lower dies arranged therebeneath, said conveyor adapted to convey said stacked blanks between said upper and lower dies, and means for operating said welding means to lower said upper dies onto said stacked blanks to weld said blanks together.

5. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts and deposits a plurality of blanks on said conveyor in stacked relation in each cycle of operation, said cyclic operation effecting means including means for operating said conveyor whereby a step by step movement is imparted to said conveyor, the means on said cyclic operation effecting means operating to advance said conveyor once in each cycle of operation of said machine whereby the plurality of blanks severed in each cycle of operation of the machine are stacked one upon the other on said conveyor, means for tightly packing the blanks stacked on said conveyor one upon the other and positioned forwardly of the severing means to be engaged by said blanks in the step by step movement of said conveyor after said conveyor moves said blanks away from said severing means, and means for welding said packed stacks of blanks whereby said stacks may be handled as units after passage thereof from said welding means.

6. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts and deposits a plurality of blanks on said conveyor in stacked relation in each cycle of operation, said cyclic operation effecting means including means for operating said conveyor whereby a step by step movement is imparted to said conveyor, the means on said cycle operation effecting means operating to advance said conveyor once in each cycle of operation of said machine whereby the plurality of blanks severed in each cycle of operation of the machine are stacked one upon the other on said conveyor, means for tightly packing the blanks stacked on said conveyor one upon the other and positioned forwardly of the severing means to be engaged by said blanks in the step by step movement of said conveyor after said conveyor moves said blanks away from said severing means, and means for welding said packed stacks of blanks whereby said stacks may be handled as units after passage thereof from said welding means, said cyclic operation effecting means including means for controlling the operation of the welding means.

7. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts and deposits a plurality of blanks on said conveyor in stacked relation in each cycle of operation, said cyclic operation effecting means including means for operating said conveyor whereby a step by step movement is imparted to said conveyor, the means on said cyclic effecting means operating to advance said conveyor once in each cycle of operation of said machine whereby the plurality of blanks severed in each cycle of operation of the machine are stacked one upon the other on said conveyor, and welding means positioned along the path of travel of said conveyor away from said severing means and operable to weld the stacks of blanks positioned on said conveyor, said welding means being arranged to weld said stacks in spaced locations on opposite sides of said conveyor, said cyclic operation effecting means also including means for controlling operation of said welding means.

8. In a machine of the class described and adapted for operation on stacks of layers of flexible metal, a pair of opposed dies having complementary faces formed to impart, when moved relatively, a predetermined configuration to a stack of layers interposed therebetween, means for relatively moving said dies, and means for supplying electric current to said dies to cause said layers to be welded together when said predetermined configuration is imparted thereto.

9. In a machine of the class described and adapted for operation on stacks of layers of flexible metal, a fixed member having a die thereon, a movable member having a die thereon adapted for cooperation with the first-named die, said dies having the opposed faces thereof formed to impart, when the die on the movable member is moved toward the die on the fixed member, a predetermined configuration to a stack of layers interposed therebetween, means for moving the movable member and operable to mave the die on such member toward and away from the die on the fixed member, and means for supplying electric current to said dies to cause said layers to be welded together when said predetermined configuration is imparted thereto.

10. Apparatus for making welded expanded metal brake shoe reinforcing which comprises the combination of means for holding a stack of superimposed pieces of expanded metal, conveying means for transporting said holding means, means operable automatically to load pieces of expanded metal on said holding means to form a stack of pieces thereon with the edges of the pieces in alignment, means at a predetermined station along said conveying means for forcing the pieces supported by said holding means into contact with each other over at least a portion of their areas, and means at said predetermined station along said conveying means for passing electrical welding current through the contacting layers of the stack supported by said holding means.

11. Apparatus for making welded expanded metal brake shoe reinforcing which comprises the combination of means for conveying superimposed pieces of expanded metal, means at a predetermined station along said conveying means for bending said pieces to arcuate shape, and means at said predetermined station along said conveying means for welding said pieces together at at least certain of their points of contact and spaced from the ends of said pieces and from medial portions thereof.

12. In a machine for welding laminated expanded metal inserts for brake shoes or the like, a machine frame, an endless conveyor supported on said frame with the upper run thereof exposed at the top of said frame, a plurality of work receiving holders mounted in spaced relation with each other on said endless conveyor to open upwardly when said holders are located on the upper run of said conveyor, each of said holders extending transversely of said conveyor and having side and bottom walls and open ends, said conveyor and said holders being so sized that the ends of stacks of sheets of expanded metal deposited therein extend beyond the ends of said holders and beyond the sides of said conveyor, means for actuating said conveyor in a step by step manner, and compressing and welding means located at a predetermined point along the upper run of said conveyor and comprising a pair of lower electrons disposed in stationary relation on opposite sides of said upper run of said conveyor in position to be engaged by the lower faces of the projecting ends of a stack of expanded metal sheets carried in a holder located at said predetermined position, a pair of upper electrodes mounted above and in vertical registry with said pair of lower electrodes, and means for shifting said upper electrodes in a downward direction to clamp the stack of sheets of expanded metal between said upper and lower electrodes relatively close to but spaced from the ends of said sheets whereby when an electric current is passed through said electrodes the sheets of said stack are welded together at points adjacent to but spaced from the ends thereof.

WILLIAM S. FRAULA